United States Patent [19]
Minamida et al.

[11] Patent Number: 5,208,434
[45] Date of Patent: May 4, 1993

[54] METHOD AND APPARATUS FOR LASER HEAT TREATMENT FOR METAL WIRE

[75] Inventors: Katsuhiro Minamida; Motoi Kido, Kanagawa, Japan

[73] Assignee: Nippon Steel Corporation, Tokyo, Japan

[21] Appl. No.: 820,310

[22] Filed: Jan. 6, 1992

[30] Foreign Application Priority Data

Jan. 10, 1991 [JP] Japan ................................. 3-1525

[51] Int. Cl.$^5$ ............................................ B23K 26/00
[52] U.S. Cl. ............................. 219/121.6; 219/121.73; 219/121.74; 219/121.82
[58] Field of Search ............... 219/121.65, 121.66, 219/121.6, 121.85, 121.73, 121.74, 121.82, 121.84

[56] References Cited

U.S. PATENT DOCUMENTS

| | | | |
|---|---|---|---|
| 4,135,902 | 1/1979 | Oehrle | 219/121.61 X |
| 4,151,014 | 4/1979 | Charschan et al. | 219/121.66 X |
| 4,456,811 | 6/1984 | Hella et al. | 219/121.74 X |
| 4,534,811 | 8/1985 | Ainslie et al. | 219/121.63 X |

FOREIGN PATENT DOCUMENTS

| | | |
|---|---|---|
| 61-170521 | 8/1986 | Japan . |
| 63-262414 | 10/1988 | Japan . |
| 2-101112 | 4/1990 | Japan . |

*Primary Examiner*—C. L. Albritton
*Attorney, Agent, or Firm*—Kenyon & Kenyon

[57] ABSTRACT

A laser beam heat treatment for a metal wire has improved incidence and processing conditions so as to achieve efficient surface heat treatment with a circumferentially averaged laser beam flux and with remarkably enhanced fatigue strength in a high speed heat treatment. The method and apparatus is characterized by forming a cone shaped mirror of circular or polygon cross section having a peak angle in a range of 5° to 20° and interior mirror surface, the cone shaped mirror defining an opening having a diameter greater than the diameter of the metal wire in a range of 0.2 to 2 mm, feeding the metal wire having a diameter less than or equal to 1 mm through the cone shaped mirror along the center axis thereof, irradiating a laser beam with an incident angle including an angular deflection with respect to the center axis of the cone shaped mirror in a range of ±10° resulting in multiple reflection of the laser beam between the interior mirror surface and the surface of the fed metal wire.

4 Claims, 6 Drawing Sheets

METHOD AND APPARATUS FOR LASER HEAT TREATMENT FOR METAL WIRE

BACKGROUND OF THE INVENTION

1. Field of the Invention

The present invention relates to a method and apparatus for laser heat treatment for a metal wire, especially for a steel wire used for automotive tires and so forth.

2. Description of the Related Art

Due to higher-performance of automotive engines and the subsequent increase in speed of automotive vehicles, steel wires used for automotive tires and so forth, are required to have higher tensile strength. In order to satisfy contemporary requirements, a tensile strength of at least 280 Kgf/mm$^2$ in a steel wire of 0.3 mm diameter is necessary and, at present, steel wire having a tensile strength of 340 Kgf/mm$^2$ is available. Furthermore, there is some steel wire having a tensile strength of 360 Kgf/mm$^2$. However, steel wire with high tensile strength does not have fatigue strength sufficient for practical use.

It is known that fatigue strength can be improved by annealing the surface of the steel wire. Therefore, there are proposals for surface enhancement by performing heat treatment using a laser beam.

Surface treatment using a laser beam has advantages in that the heat treatment can be done on the surface of the articles to be treated and can be performed in a short period. On the other hand, however, it is difficult to establish a uniform energy distribution for a relatively wide area because of the high directionality and convergence of the laser beam. For uniform distribution of the laser beam energy, a converging optical system, such as a defocused beam type, a split mirror line beam type, or a beam scanner type, are practically employed. However, since the energy density to be irradiated on the article to be processed is lower than that used for laser welding or laser cutting and so forth and the reflectivity of the laser beam at the surface of the processed article is high, there is a necessity for the application of a beam absorbing material. Also, since the reflectivity increases according to a reduction of incident angle, adjustment for incident angle of the laser beam becomes necessary.

On the other hand, Japanese Unexamined Patent Publication (Kokai) 61-170521 discloses irradiation of a laser beam in a direction approximately perpendicular to the longitudinal axis of the processed article or in the axial direction in case of heat treatment of elongated articles, such as steel wires or round bars and so forth, employing the laser beam. However, in the former case, i.e. irradiating the laser beam in approximately a transverse direction, absorption of the laser beam becomes non-uniform in the circumferential direction of the processed article to lower the energy efficiency. Improvement in the energy efficiency can be expected by applying a laser absorbing material on the surface of the processed article. However, difficulty arises in the application of the laser absorbing material. In particular, in the case of an application of laser absorbing material in an on-line process in the production line clearly requires increasing the process steps and thus causes an increase in production costs. On the other hand, in the latter case, due to a small incident angle, reflectivity of the laser beam increases to significantly lower the energy utilization efficiency.

For improving such problems, the inventions have proposed, in Japanese Unexamined Patent Publications 63-262414 and 2-101112 which have been commonly assigned to the assignee of the present invention, methods for the heat treatment of elongated articles, in which a cone shaped mirror with a polygon or circular cross section is employed for irradiating the laser beam irradiated along the center axis thereof and heat treatment for the processed article is fed though the cone shaped mirror by multiple reflection. In the proposed process, the laser beam irradiated along the center axis of the mirror causes multiple reflection on the mirror surface and converges toward the peak of the mirror enabling a heat treatment with enhanced energy efficiency. The disclosure of the above-identified Japanese Unexamined Patent Publications 63-262414 and 2-101112 are herein incorporated by reference.

SUMMARY OF THE INVENTION

It is an object of the present invention to solve the above-mentioned problems in the prior art.

Another and more specific object of the invention is to improve the incident and processing condition of the laser beam in a heat treatment for articles to be processed, particularly for steel wire of less than or equal to 1 mm in diameter employing a cone shafted mirror as disclosed in the above-mentioned publications, so that the laser beam is focussed in the vicinity of the top end with multiple reflection for rising energy density to perform a highly efficient heat treatment with unified beam's in a circumferential direction for increasing fatigue strength through high speed heat treatment.

In order to accomplish the above-mentioned object, a method of heat treatment for a metal wire employing a laser, comprising the steps of:

forming a cone shaped mirror of circular or polygon cross section having peak angle in a range of 5° to 20° and an interior mirror surface, the cone shaped mirror defining an opening having a diameter greater than the diameter of the metal wire in the range of 0.2 to 2 mm;

feeding the metal wire having a diameter less than or equal to 1 mm through the cone shaped mirror along the center axis thereof;

irradiating a laser beam with an incident angle including an angular offset with respect to the center axis of the cone shaped mirror in a range of ±10° for causing multiple reflection of the laser beam between the interior mirror surface and the surface of the fed metal wire.

The metal wire to be processed in the abovementioned laser heat treatment process has a composition in percent by weight as follows:

C: 0.6~1.2%
Si: 0.1~0.5%
Mn: 0.2~0.8%
P: 0.02% or less
S: 0.002~0.02%
Cr: 0.1~0.7% as required
Fe: in substantially of balance, the metal wire of which is provided with brass plating and has a tensile strength higher than or equal to 280 Kgf/mm$^2$.

According to the present invention, there is further provided an apparatus for the heat treatment of a metal wire employing a laser, comprising:

a cone shaped mirror of circular or polygon cross section having a peak angle in a range of 5° to 20° and an interior mirror surface, the cone shaped mirror defining an opening having a diameter greater than the diameter of the metal wire in a range of 0.2 to 2 mm;

a mirror angle adjusting mechanism provided at the bottom of the cone shaped mirror, mirror angle adjusting mechanism including an opening for feeding the metal wire therethrough, a deflecting mirror associated with the mirror angle adjusting mechanism for deflecting a laser beam toward the interior of the cone shaped mirror, the laser beam of which is displaceable in an incident angle establishing an angular deflection with respect to the center axis of the cone shaped mirror in a range of ±10°.

DESCRIPTION OF THE PREFERRED EMBODIMENT

The present invention will be discussed herebelow in detail with reference to the accompanying drawings.

Figure 1:
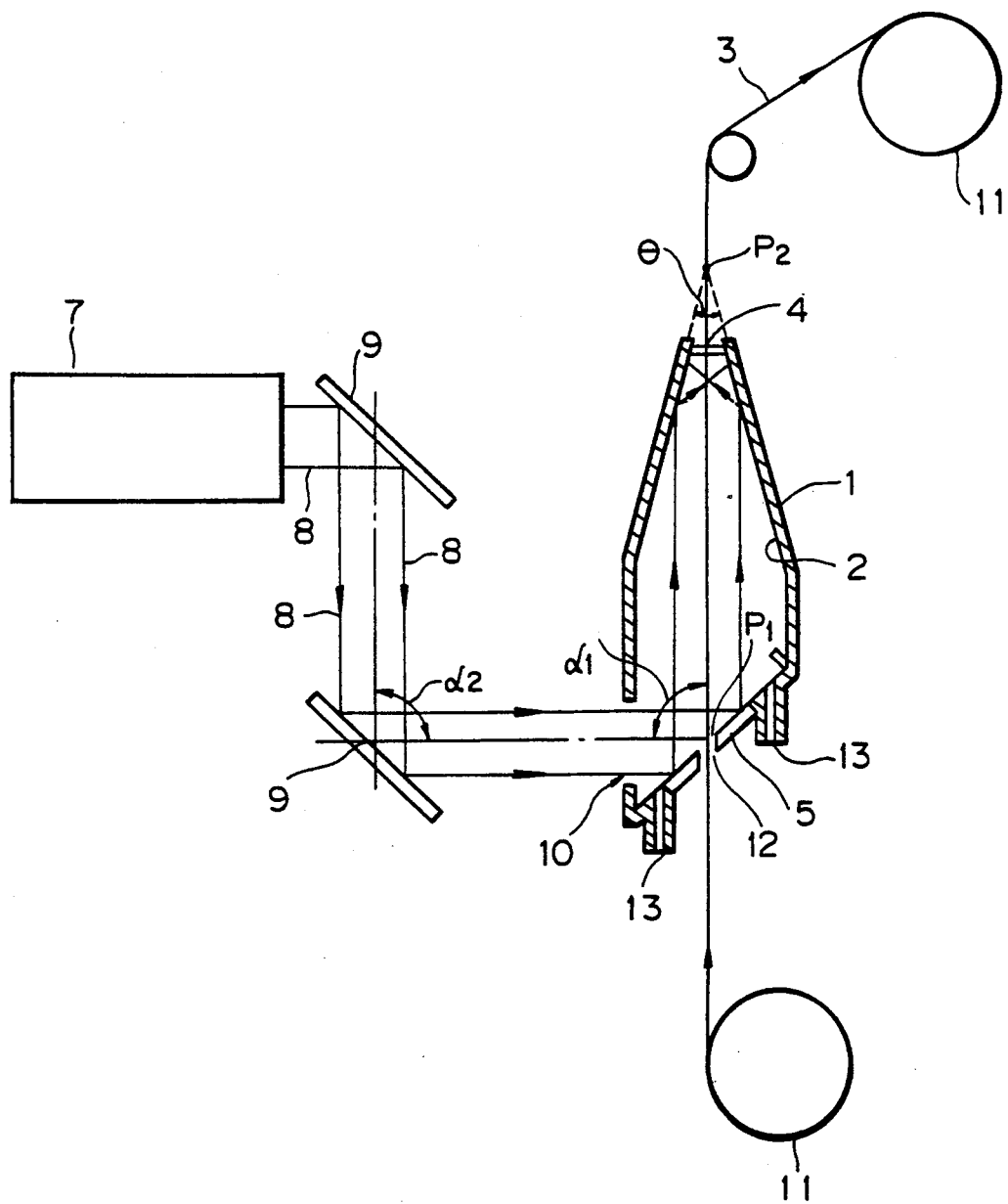
FIG. 1 is a schematic illustration showing an apparatus for the heat treatment of a steel wire according to the present invention.

FIG. 1 is a diagrammatic illustration showing one example of a facility for laser heat treatment employing a conical mirror 1 of the present invention. The conical mirror 1 is made from sheet metal, such as a copper plate and formed into a conical shaped configuration. The inner surface 2 is processed into a mirror surface by plating of gold and so forth or by polishing so that an incident laser beam can be easily reflected. It should be noted that the configuration of the mirror is not specified to be a conical shaped configuration but can be a polygonal cone shaped configuration. In the case of a polygonal cone shaped configuration of the mirror, the peak angle θ (angle to the tangent of inscribing circle) is preferably in a range of 5° to 20°. The top end of the conical mirror 1 defines an outlet opening 4 for a metal wire 3 that is to be subject to heat treatment. The diameter of the output opening 4 is set to be greater than the metal wire 3 in a range of 0.2 to 2 mm. A deflecting mirror 5 is provided on the bottom of the conical mirror 1 for deflecting a laser beam toward the interior of the conical mirror. The deflecting mirror 5 is oriented to the mirror surface thereof essentially at 45° with respect to the axis of the conical beam. The deflecting mirror 5 is provided with a mirror angle adjusting mechanism 6 (see FIGS. 2 and 3) that permits the adjustment of the orientation of the mirror surface of the deflecting mirror 5 in a range of ±10°.

In the drawings, the reference numeral 7 denotes a laser beam generator. The laser beam 8 discharged from the laser beam generator 7 irradiated onto the deflecting mirror 5 through deflecting mirrors 9, 9 and a window 10 defined through the periphery of the conical mirror 1 and then irradiated into the interior of the conical mirror. The reference numeral 11 denotes a feeding device for the metal wire 3, which adjusts the feed speed for feeding the metal wire through the conical mirror 1 at a predetermined speed. The reference numeral 12 denotes an inlet opening for the metal wire 3 defined through the deflecting mirror 5. The reference numeral 13 denotes gas inlets for introducing non-oxidation gas into the conical mirror 1 for establishing a non-oxidizing atmosphere within the interior space of the conical mirror.

Figure 2:
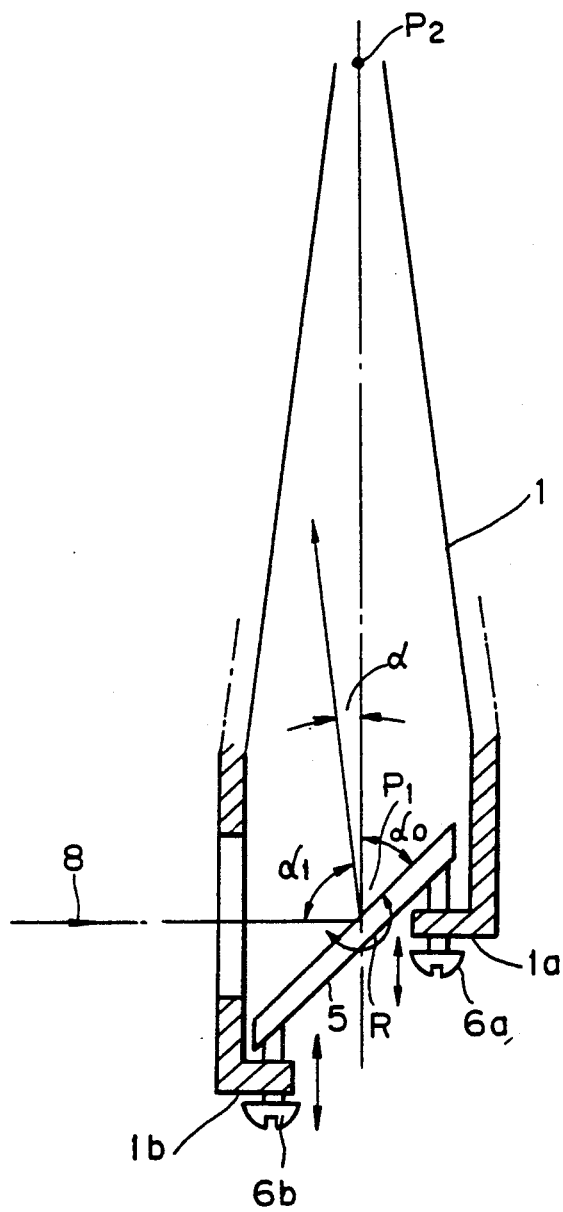
FIG. 2 is an enlarged section showing one example of a mirror angle adjusting mechanism to be employed in the apparatus of FIG. 1.

FIG. 2 shows one example of a mirror angle adjusting mechanism 6, The mirror angle adjusting mechanism 6 includes adjusting means 6a and 6b movable toward and aft with respect to the flanges 1a and 1b of the conical mirror with threading means or so forth for displaceably mounting the deflecting mirror 5 onto the bottom of the conical mirror 1. The adjusting means 6a and 6b are operable independently of each other, or, as an alternative, in synchronism with each other for enabling fine adjustment of the orientation of the mirror surface of the deflecting mirror 5 in a range of ±10° in relation to a set position (i.e. 45° with respect to the center axis of the conical mirror 1). At the set position, in which the laser beam 8 is irradiated onto the deflecting mirror 5 so that the axis thereof coincides with the center axis P1-P2 of the conical mirror at the mirror surface of the deflecting mirror 5, the laser beam irradiated onto the mirror surface of the deflecting mirror 5 is reflected in a coaxial fashion with the center axis P1-P2 of the conical mirror. At this position, the angle α0 formed by the center axis P1 and P2 and the mirror surface of the deflecting mirror is 45°. Consequently, the deflecting angle formed by the incident laser beam 8 onto the mirror surface of the deflecting mirror 5 and the reflected laser beam therefrom becomes 90°. For establishing angular offset α, the adjusting means 6a and 6b are operated so as to cause angular displacement of the deflecting mirror 5 about the center P1 in a direction indicated by the arrow R. At the adjusted position with the angular offset α, the deflecting angle α1 of the laser beam becomes smaller or greater than 90° (becomes smaller in the shown case).

Figure 3:
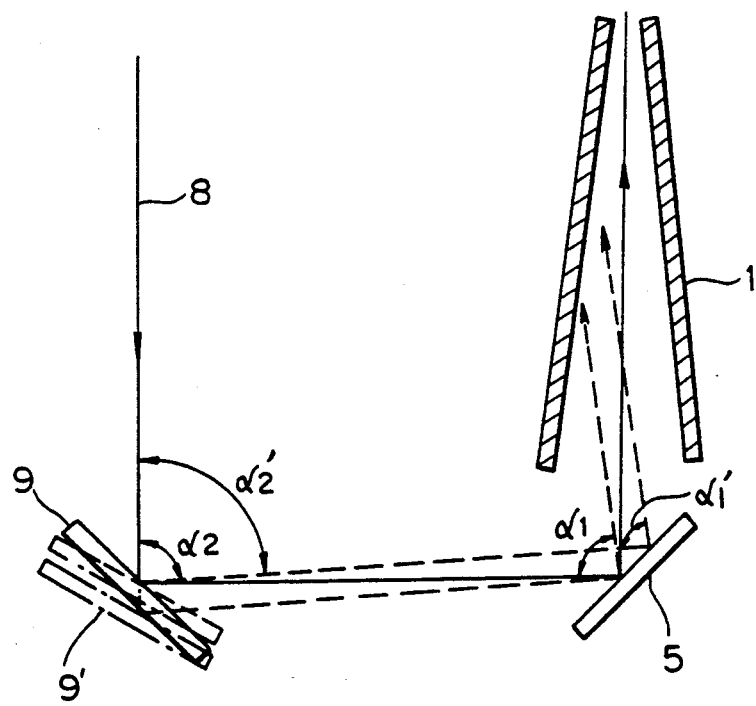
FIG. 3 is an illustration showing another example of a mirror angle mechanism to be employed in the apparatus of FIG. 1.
Figure 4:
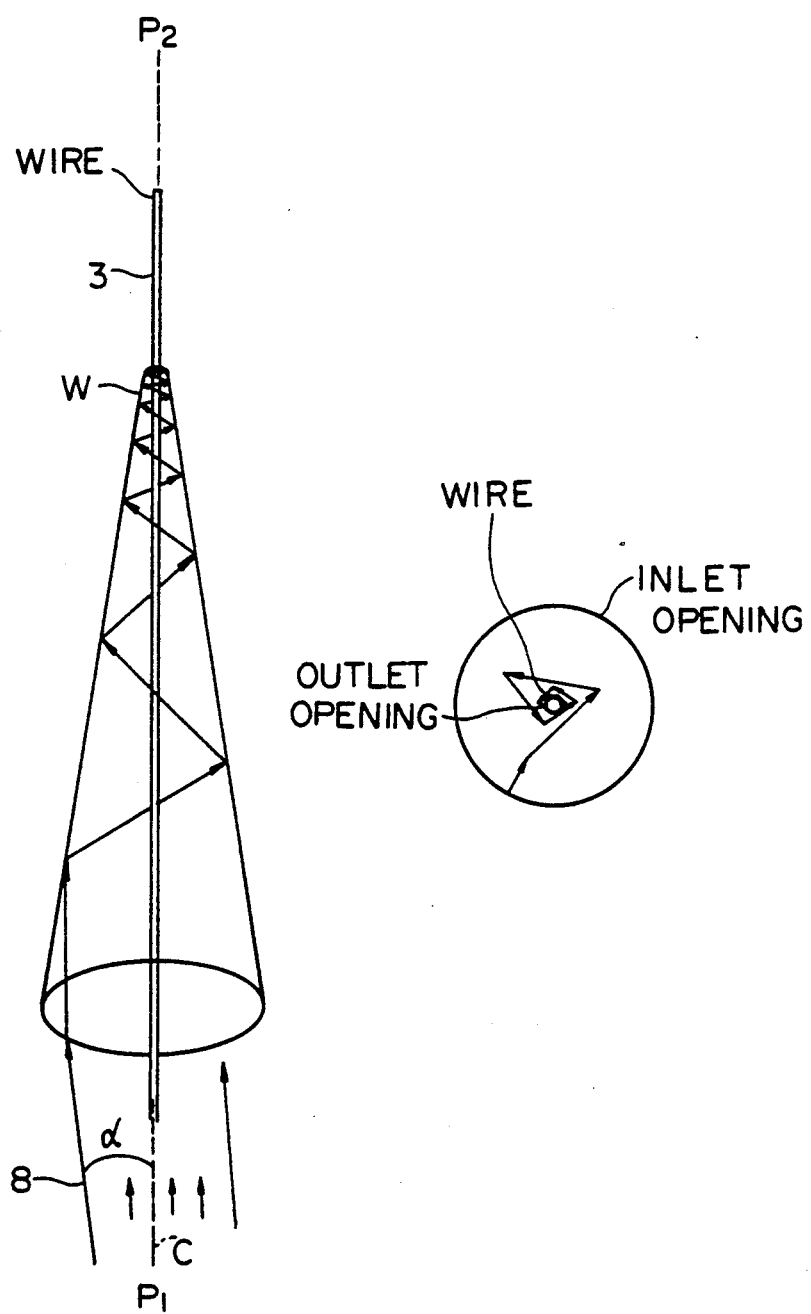
FIG. 4 is an explanatory illustration showing an irradiating condition in a conical mirror of the invention.

FIG. 3 shows another embodiment mirror angle adjusting mechanism. In this embodiment, the incident angle of the laser beam for the deflecting mirror 5 is adjusted by adjusting the reflecting angle of the deflecting mirror 9. Namely, when the reflecting angle α2 of the deflecting mirror 9 is adjusted to be a smaller angle α2' as shown by the broken line, the deflecting angle α1 of the deflecting mirror 5 correspondingly becomes a smaller angle α1'. In such cases, since variation of the incident angle for the deflecting mirror 5 associates with the offset of an irradiating position of the laser beam onto the mirror surface of the deflecting mirror 5, it is preferable to shift the deflecting mirror 9 to a position (9') along the incident beam so that the irradiating point of the laser beam on the mirror surface of the deflecting mirror 5 becomes coincident with the position of the center axis of the conical mirror 1.

For the conical mirror 1 with the mirror angle adjusting mechanism, the metal wire 3 is introduced through the inlet opening 12, fed along the center axis of the conical mirror, subject to surface heat treatment (surface annealing) by the laser beams and then fed out through the outlet opening 4 at the top end.

Figure 5:
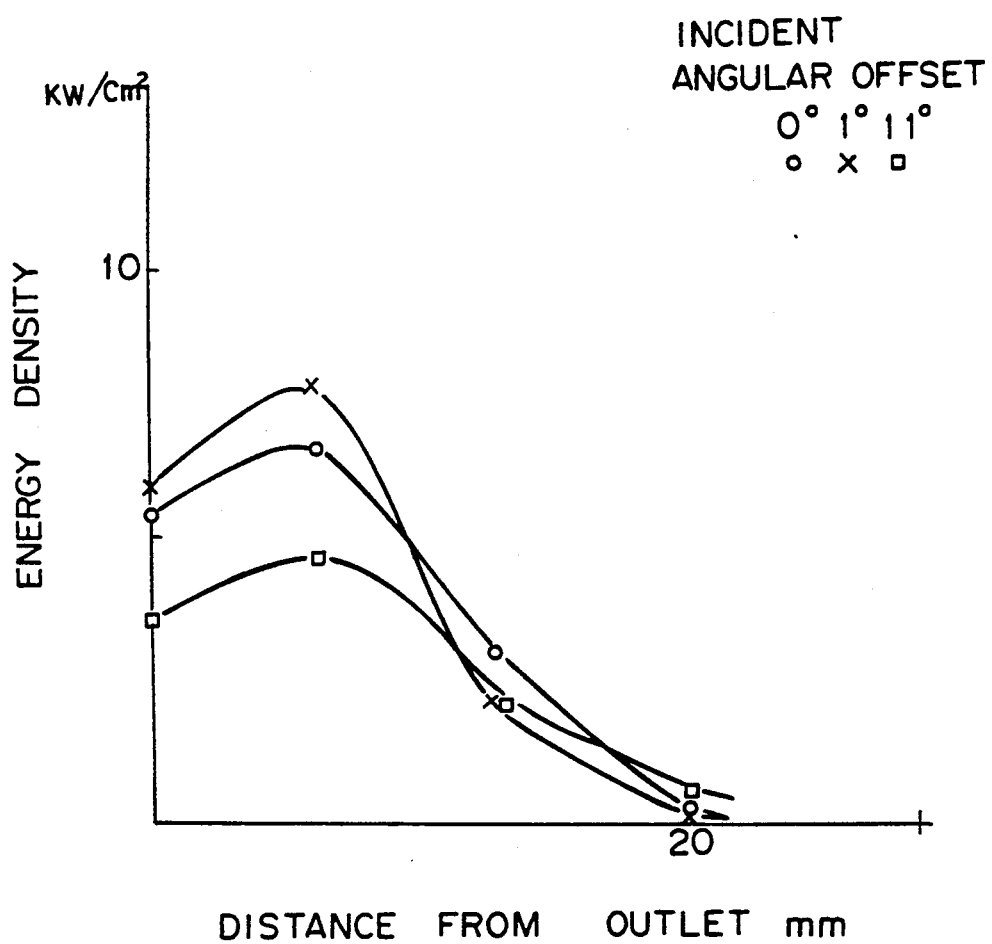
FIG. 5 is a graph showing the relationship between an incident angle of the laser means for the conical mirror of the invention and the energy density.
Figure 6:
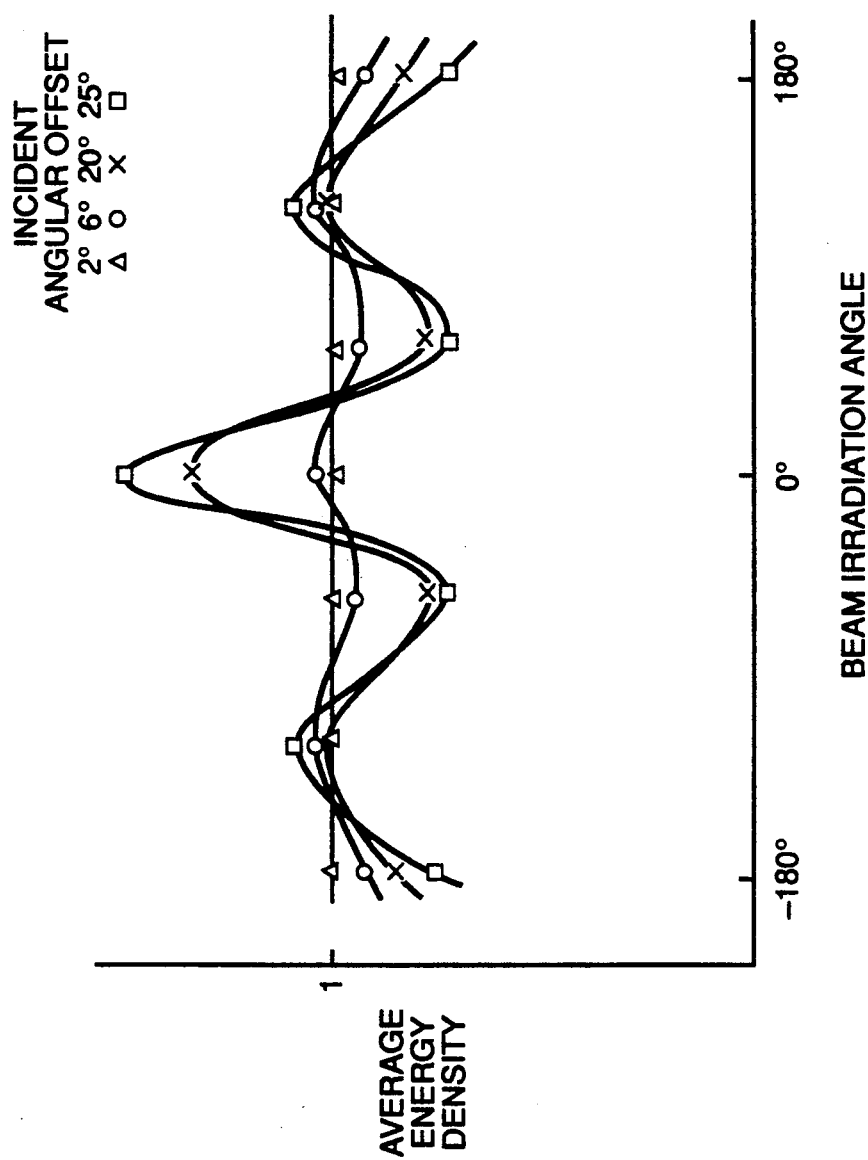
FIG. 6 is a graph showing the relationship between the incident angle of the laser beam for the conical mirror of the invention and an average energy density around the circumference of the processed wire.

By the operation of the mirror angle adjusting mechanism 6 for establishing the angular offset of the reflected laser beam 8 from the deflecting mirror 5, the axis of the reflected beam becomes slightly angled with respect to the center axis P1-P2 of the conical mirror (within an angular range less than or equal to 10° with respect to the center axis of the conical mirror). Then, the reflected beam is advanced and repeatedly reflected on the interior mirror surface of the conical mirror around the metal wire 3 and reaches a working point W in the vicinity of the top end of the conical mirror 1. It has been found that there is a close relationship between the angular offset α of the laser beam and the energy density around the circumferential surface of the angle α. As can be clear from FIG. 5, by employing the laser beam 8 having an incident angle offset in a magnitude of α, higher peak power can be obtained for heat treatment of the wire in comparison with that employing the laser beam deflected to be substantially parallel to the center axis of the conical mirror 1. Also, as can be clear from FIG. 6, with the angular offset α in a range of less than or equal to 10°, uniform heat treatment over the entire circumference of the metal wire becomes possible. When the angular offset α is set greater than 10°, the reversal of the advance of the laser beam can occur before it reaches the working point W resulting in insufficient peak power at the working point.

On the other hand, the necessary power A for heat treatment of the metal wire can be obtained relative to the laser beam source power p and process speed v based on the results of experiments and expressed by the following equation.

$$A = C \cdot p^{0.7}/(d \cdot v^{0.5})$$

wherein C is a constant in process, d is a given diameter of the metal wire

Preferably, the power for treatment is at least 5 kW/cm². For obtaining this condition, is becomes necessary to specify the construction of the conical mirror 1. Namely, by setting the peak angle θ of the conical mirror greater than or equal to 5°, the power for heat treatment is greater than or equal to 5 kW/cm². However, when the peak angle θ of the conical mirror 1 exceeds 20°, uniformity of the treatment power in the circumferential direction becomes difficult to obtain thereby making it difficult to perform a uniform heat treatment. On the other hand, the diameter of the outlet opening 4 of the top end of the conical mirror 1 also influences the focussing of the laser focussed power. Through experiments performed by the inventors for heat treatment for a steel wire of a 0.3 mm diameter with a laser beam having 500 W of output power and a 10 mm diameter, the relationship between the diameter of the outlet opening 4 at the top end of the conical mirror 1 and the energy loss is shown in the following table. As can be seen from the table, energy loss is significantly increased according to an increase of the outlet diameter.

| Outlet Diameter (mm) | Energy Loss (W) |
| --- | --- |
| 0.4 | 0.7 |
| 0.5 | 11.0 |
| 1.0 | 30.3 |
| 2.5 | 80.6 |

From the results set out above, the diameter at the outlet opening 4 is set to be greater than that of the metal wire in a magnitude of 0.2 to 2 mm. Namely, when the diameter difference between the metal wire and the outlet opening 4 is smaller than 0.2 mm, the energy loss can be significantly reduced. However, interference between the metal wire and the peripheral edge of the outlet opening can occur. On the other hand, when the difference is set to be greater than 2 mm, energy loss becomes substantial and unacceptably lowers the treatment efficiency.

In the present invention, during heat treatment with the laser beam, it is preferable to maintain the interior of the conical mirror in inert atmosphere, e.g., Ar gas and so forth, so that oxidation on the treated surface of the steel wire cannot occur within the conical mirror.

Furthermore, the treatment can be further facilitated by positioning the above-mentioned laser heat treatment apparatus between dies of the metal wire production line.

The present invention is particularly suitable for producing thin metal wire of diameter less than or equal to 1 mm and having a tensile strength greater than or equal to 280 Kgf/mm². For achieving this, the composition is specified for the following reasons.

C is contained for providing sufficient tensile strength. When the content of C is less than 0.6%, the tensile strength becomes insufficient. On the other hand, when the content of C exceeds 1.2%, toughness degradation can occur. Accordingly, the preferable range of the content of C is specified within a range of 0.6 to 1.2%.

Si is a normally contained composition for deoxidation. Up to 1% of the Si content is acceptable for increasing steel strength. Preferred content is 0.8%.

Mn is added for assuring sufficient hardenability. However, when the content of Mn exceeds 0.8%, workability of the heat treatment can be degraded.

P and S are contained for increasing toughness. Contents of both are limited to be less than or equal to 0.02%. It should be noted that lowering of the S content may contribute to improving the tightness of brass plating.

Cr is an additive to be added as required and added in the content of greater than or equal to 0.1% for increasing the strength. However, when the content of Cr exceeds 0.7%, workability in heat treatment can be degraded.

It should be noted that brass plating enhances the corrosion resistance of the steel wire and, when the steel wire is used for tires and so forth, the tightness fitting ability with rubber can be enhanced.

Embodiment

With the apparatus shown in FIG. 1, treatment is performed for high carbon steel wire of 0.3 mm diameter. Namely, within the conical mirror 1, by means of the feeding device, the steel wire was fed through the conical mirror at a speed of 80 m/min. The laser beam (11 mmΦ) with 500 W of output power was discharged from the laser beam generator 7. 0.3° of angular displacement with respect to the center axis of the conical mirror was provided by the deflecting mirror for irradiation within the interior space of the conical mirror. The peak angle of the conical mirror is 10°, and the diameter at the outlet opening was 1 mm.

The steel wire was processed by the method according to the invention, an annealed thin surface layer of 1 μm was formed while maintaining uniformity in the circumferential direction. The steel wire thus produced has 330 Kgf/mm² of tensile strength, 60 Kgf/mm² (test was performed by aggregating seven wires) of bending fatigue strength. In contrast, the steel wire of which the laser treatment is not performed, had a tensile strength of 330 Kgf/mm² equivalent to that of the present invention as set forth above. However, the bending fatigue strength was 30 Kgf/mm². From the comparison, it should be appreciated that the steel wire treated by the heat treatment according to the present invention has better properties in terms of fatigue strength.

What is claimed is:

1. A method for the heat treatment of a metal wire employing a laser, comprising the steps of:
    forming a cone shaped mirror of circular or polygon cross section having a peak angle in a range of 5° to 20° and interior mirror surface, said cone shaped mirror defining an opening having a diameter greater than the diameter of the metal wire in a range of 0.2 to 2 mm;
    feeding the metal wire having a diameter less than or equal to 1 mm through said cone shaped mirror along the center axis thereof;
    irradiating a laser beam with an incident angle including an angular deflection with respect to the center axis of said cone shaped mirror in a range of ±10°, resulting in multiple reflection of the laser beam between the interior mirror surface and the surface of the fed metal wire.

2. A method as set forth in claim 1, wherein the composition of metal wire in percent by weight is:
    C: 0.6~1.2%
    Si: 0.1~0.5%
    Mn: 0.2~0.8%
    P: 0.02% or less
    S: 0.002~0.02%
    Fe: in substantially of balance, the metal wire of which is provided with brass plating and has a tensile strength higher than or equal to 280 Kgf/mm².

3. A method as set forth in claim 2, in which said metal wire further composed of Cr present in an amount of 0.1~0.7% by weight.

4. An apparatus for the heat treatment of a metal wire employing a laser, comprising:
    a cone shaped mirror of circular or polygon cross section having a peak angle in a range of 5° to 20° and interior mirror surface, said cone shaped mirror defining an opening having a diameter greater than the diameter of the metal wire in a range of 0.2 to 2 mm;
    a mirror angle adjusting mechanism provided at the bottom of said cone shaped mirror, a mirror angle adjusting mechanism including an opening for feeding the metal wire therethrough,
    a deflecting mirror associated with said mirror angle adjusting mechanism for deflecting a laser beam toward the interior of said cone shaped mirror, laser beam of which is displaceable in an incident angle establishing an angular deflection with respect to the center axis of said cone shaped mirror in a range of ±10°.

* * * * *